(12) United States Patent
Ihara et al.

(10) Patent No.: US 8,306,776 B2
(45) Date of Patent: Nov. 6, 2012

(54) METHOD AND SYSTEM FOR CALCULATING MISALIGNMENT OF ROTATIONAL BODY

(75) Inventors: Keisuke Ihara, Takasago (JP); Toshiyuki Sakae, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 217 days.

(21) Appl. No.: 12/678,018

(22) PCT Filed: Jun. 30, 2008

(86) PCT No.: PCT/JP2008/061864
§ 371 (c)(1),
(2), (4) Date: Mar. 12, 2010

(87) PCT Pub. No.: WO2010/001457
PCT Pub. Date: Jan. 7, 2010

(65) Prior Publication Data
US 2010/0241394 A1      Sep. 23, 2010

(51) Int. Cl.
*G01C 9/00* (2006.01)
(52) U.S. Cl. .......... 702/151; 702/154; 702/157; 702/189
(58) Field of Classification Search .......... 702/150–151, 702/154
See application file for complete search history.

(56) References Cited

U.S. PATENT DOCUMENTS

| | | | | |
|---|---|---|---|---|
| 4,934,192 A | * | 6/1990 | Jenkins | 73/660 |
| 5,151,870 A | | 9/1992 | Beebe et al. | |
| 5,263,261 A | * | 11/1993 | Piety et al. | 33/645 |
| 5,311,666 A | * | 5/1994 | Jacobsen et al. | 33/1 PT |
| 5,694,339 A | * | 12/1997 | Ishitoya et al. | 702/167 |
| 6,526,364 B2 | * | 2/2003 | Omori et al. | 702/95 |
| 6,568,096 B1 | * | 5/2003 | Svitkin et al. | 33/550 |
| 7,366,637 B2 | * | 4/2008 | Goto et al. | 702/167 |
| 7,636,646 B2 | * | 12/2009 | Kojima | 702/168 |

(Continued)

FOREIGN PATENT DOCUMENTS

GB         2294327 A  *  4/1996

(Continued)

OTHER PUBLICATIONS

Tan, Jiubin et al., "Least Square Circle Model and Parametric Estimating Method for the Superprecision Measurement of Circle Contour", 1992, IEEE, pp. 813-817, doi: 0-7803-0582-5/92.*

(Continued)

*Primary Examiner* — Jonathan C Teixeira Moffat
*Assistant Examiner* — Mischita Henson
(74) *Attorney, Agent, or Firm* — Kanesaka Berner & Partners

(57) ABSTRACT

In a method of calculating misalignment of a rotational body, radial displacement values are measured using a displacement gauge. A calculation part performs the steps of deriving radial displacement amounts of the rotational body for at least four or more measurement points along an outer surface while rotating the rotational body, selecting three arbitrary points to calculate a circle, calculating circle values for all the measurement points, calculating differences between the calculated circle values and the radial displacement amounts as error amounts, summing the error amounts to derive a total error amount, repeating circle calculation for different combinations and calculating a total error amount for each calculated circle, selecting a circle with a minimum total error amount as a most probable circle, and calculating deviation between the center of the most probable circle and the center of rotation of the rotational body.

8 Claims, 13 Drawing Sheets

U.S. PATENT DOCUMENTS

| | | | |
|---|---|---|---|
| 2003/0172738 A1* | 9/2003 | Poizat et al. | 73/660 |
| 2005/0160211 A1* | 7/2005 | Kadowaki et al. | 710/300 |
| 2007/0100554 A1* | 5/2007 | Kawai et al. | 702/1 |
| 2009/0048799 A1* | 2/2009 | Kadowaki et al. | 702/95 |

FOREIGN PATENT DOCUMENTS

| | | |
|---|---|---|
| JP | 53029157 | 3/1978 |
| JP | 05-187816 A | 7/1993 |
| JP | 6508680 A | 9/1994 |
| JP | 07-037104 A | 2/1995 |
| JP | 07-332949 A | 12/1995 |
| JP | 10-239576 A | 9/1998 |
| JP | 11-230733 A | 8/1999 |
| JP | 2001-091244 A | 4/2001 |
| JP | 2005-031005 A | 2/2005 |

OTHER PUBLICATIONS

Henry, R. et al., "Understanding Shaft Alignment: Basics", Dec. 1, 2002, VibrAlign Inc., pp. 1-3.*

Howes, B.C., "A New Shaft Alignment Technique", no date, Beta Machinery Analysis Ltd., pp. 1-9.*

VibraAlign, "Dynamic Movement White Paper", 2002, VibraAlign Inc., pp. 1-25.*

ISR for PCT/JP2008/061864 dated Sep. 22, 2008.

A Korean Notice of Allowance, dated May 7, 2012 for KR Application No. 2010-7002548.

* cited by examiner

FIG. 7

| MEASUREMENT POINT | MEASURED ANGLE (°) | EXAMPLE 1 | | EXAMPLE 2 | |
|---|---|---|---|---|---|
| | | MEASURED VALUE (1/100mm) | MOST PROBABLE CIRCLE CALCULATED CIRCLE VALUE (1/100mm) | MEASURED VALUE (1/100mm) | MOST PROBABLE CIRCLE CALCULATED CIRCLE VALUE (1/100mm) |
| X1 | 0 | 0.0* | 0.0 | 0.0* | 0.0 |
| X2 | 45 | -0.5 | -0.5 | -0.5* | -0.5 |
| X3 | 90 | -1.4 | -1.4 | -1.4 | -1.5 |
| X4 | 135 | -2.3* | -2.3 | -2.3 | -2.4 |
| X5 | 180 | -2.6* | -2.6 | -10.0 | -2.7 |
| X6 | 225 | -2.1 | -2.1 | -2.1 | -2.2 |
| X7 | 270 | -1.2 | -1.2 | -1.2 | -1.2 |
| X8 | 315 | -0.3 | -0.3 | -0.3* | -0.3 |
| MISALIGNMENT AMOUNT (1/100mm) | | 1.305 | | 1.373 | |
| MISALIGNMENT ANGLE (°) | | -5.021 | | -5.912 | |

NOTE: ASTERISK DENOTES USED POINT FOR DETERMINING MOST PROBABLE CIRCLE

FIG. 9

| MEASUREMENT POINT | MEASURED ANGLE (°) | MEASURED VALUE (1/100mm) | MOST PROBABLE CIRCLE CALCULATED CIRCLE VALUE (1/100mm) | MOST PROBABLE CIRCLE ERROR AMOUNT (1/100mm) |
|---|---|---|---|---|
| $X_1$ | 0 | 0.0* | 0.0 | 0.0 |
| $X_2$ | 45 | -0.5* | -0.5 | 0.0 |
| $X_3$ | 90 | -1.4 | -1.5 | 11.4 |
| $X_4$ | 135 | -2.3* | -2.4 | 17.2 |
| $X_5$ | 180 | -10.0 | -2.7 | 52833.0 |
| $X_6$ | 225 | -2.1 | -2.2 | 17.2 |
| $X_7$ | 270 | -1.2 | -1.2 | 0.5 |
| $X_8$ | 315 | -0.3* | -0.3 | 0.0 |

NOTE: ASTERISK DENOTES USED POINT FOR DETERMINING MOST PROBABLE CIRCLE

METHOD AND SYSTEM FOR CALCULATING MISALIGNMENT OF ROTATIONAL BODY

RELATED APPLICATIONS

The present application is the US national phase of, and claims priority from, International Application Number PCT/JP2008/061864, filed Jun. 30, 2008, the disclosure of which is hereby incorporated by reference herein in its entirety.

TECHNICAL FIELD

The present invention relates to a method and a system for calculating misalignment of a rotational body.

BACKGROUND ART

Generally, axial deformation or misalignment that occurs in a rotational body causes imbalance of the rotational body, which may cause shaft vibration during operation. Excessive shaft vibration causes an abnormality in a bearing part and prevents normal operation. A further progress of the excessive vibration may lead to a break of the shaft. Thus, to prevent such a break, it is important to keep axial deformation or misalignment of the rotational body within an acceptable value.

Rotational bodies covered by the present invention include a gas turbine rotor, and also rotors for a rotary machine such as a steam turbine rotor, a rotor for a compressor, a rotor for a hydraulic turbine, rotors for various pumps, and rotors for various blowers.

A gas turbine rotor will be specifically described by way of example. FIG. 11 shows a general structure of a gas turbine rotor. The gas turbine rotor 1 includes a compressor rotor part 10, a turbine rotor part 20, and an intermediate shaft 25 connecting the rotor parts, and the compressor rotor part 10 and the turbine rotor part 20 are each constituted by disk-shaped rotor disks 50 including blades 11 radially implanted in an outer periphery. The gas turbine rotor 1 has an integral structure in which the rotor disks 50 are placed one next to another in a rotor axis direction and fastened by spindle bolts 30, and opposite ends thereof are supported by bearings S1 and S2.

Axial deformation that occurs in the gas turbine rotor 1 having such a configuration causes shaft vibration. Also, a gap between a front end of each of the blades 11 mounted to the outer periphery of the rotor disk 50 and an outer casing (not shown) is adjusted to be substantially constant in a circumferential direction. An increase in shaft vibration causes interference between the front end of the blade and the casing, which may disable operation. Thus, an axial deformation amount needs to be adjusted at the time of assembling the rotor to be kept within an acceptable value. Also, when the axial deformation exceeds the acceptable value, the axial deformation needs to be corrected.

The axial deformation is corrected by the following procedure. In the configuration of the gas turbine rotor 1 shown in FIG. 11, misalignment data including a misalignment amount and a misalignment angle is calculated for each rotor disk 50 to determine the distribution of axial deformation of the gas turbine rotor 1. An example of the distribution of axial deformation is shown in FIG. 12. The abscissa represents a distance along the rotor from the bearing S1, and the ordinate represents a misalignment amount of each rotor disk 50.

One factor of occurrence of the axial deformation is a nonuniform thickness of the rotor disk 50. Thus, the misalignment amount of the rotor disk 50 sometimes exceeds the acceptable value depending on the way of placing the rotor disks 50 one next to another. In this case, a rotor disk 50 to be corrected is selected from the distribution of axial deformation, joint surfaces between the rotor disks 50 are cut to correct the axial deformation of the gas turbine rotor 1 so as to reduce a contact surface angle ($\alpha$) between the rotor disks 50 (FIG. 13).

FIG. 13 shows a state where the axial deformation of the gas turbine rotor 1 occurs. FIG. 13 shows the rotor disk 50, a rotor disk joint surface 51, the contact surface angle ($\alpha$) between adjacent rotor disks 50, and a relationship between a misalignment amount of a rotor core and a radial deflection amount of the rotor disk 50.

The radial deflection amount of the rotor disk 50 is obtained by selecting a plurality of measurement points at circumferentially regular intervals on an outer surface 52 of each rotor disk 50 while rotating the rotor, and measuring a radial displacement amount at each measurement point from a reading of a displacement gauge at the measurement point. Specifically, with reference to a measurement starting point (a displacement amount at the measurement starting point is zero for convenience), a radial displacement amount of the rotor at each measurement point from the measurement starting point is regarded as a deflection amount at each measurement point. As a displacement gauge, various known sensors are used. For example, a contact sensor such as a dial gauge, or a noncontact sensor such as a laser sensor, a capacitance sensor, or an ultrasonic sensor can be used.

Misalignment data is calculated from a measured value of the deflection amount at each measurement point. As shown in FIG. 13, the radial deflection amount of the gas turbine rotor 1 is indicated by a fluctuation range of a distance between the outer surface 52 of the rotor disk 50 and the rotor rotation center. The rotor rotation center refers to a straight line connecting the centers of the bearing $S_1$ and the bearing $S_2$. From the measured value of the deflection amount on the outer surface 52 of the rotor disk 50, the center of figure $O_1$ of a section of the rotor disk 50 to be measured is calculated, and deviation between the calculated center of figure $O_1$ and the rotor rotation center $O_2$ is regarded as misalignment. The misalignment thus obtained is quantitatively indicated as misalignment data including a misalignment amount and a misalignment angle.

Patent Citations 1 and 2 disclose a general method for calculating misalignment of a rotational body. Also, a method such as a least squares method is disclosed as means for calculating misalignment.

Patent Citation 1

Japanese Unexamined Patent Application, Publication No. 2001-91244

Patent Citation 2

Japanese Unexamined Patent Application, Publication No. Hei 5-187816

DISCLOSURE OF INVENTION

Generally, for examining misalignment of a rotational body, it is necessary that data measured in the field by an examiner is captured online, a measurement result is instantaneously fed back to the examiner, and remeasurement is performed as required. For this purpose, a simple calculation method is desirably selected. However, the methods disclosed in Patent Citations 1 and 2 require an enormous amount of calculation; therefore, a simpler method is desired.

Examination is sometimes performed with rust or a flaw on an outer surface of the rotational body. When such an abnormal outer surface is accidentally selected as a measurement point, a normal outer surface is not measured by a displacement gauge, and a measured value needs to be eliminated as an abnormal value.

However, the least squares method or the like applied to the conventional methods for calculating misalignment s disclosed in Patent Citations 1 and 2 is originally a calculation method with high accuracy, but when measurement including an abnormal value is performed, a misalignment amount is calculated with the abnormal value captured as it is.

Thus, the influence of the abnormal value prevents expected accuracy from being obtained, and eliminating the abnormal value is difficult.

Meanwhile, to reduce the influence of the abnormal value, as many measurement points as possible need to be selected, which requires an enormous amount of calculation.

The present invention is achieved to solve these problems, and has an object to provide a simpler method for calculating misalignment than conventional methods and a system therefor.

A first solution provides a method for calculating misalignment of a rotational body, including the steps of: deriving radial displacement amounts of the rotational body for at least four or more measurement points along an outer surface in a circumferential direction based on measured values measured by a displacement gauge while rotating the rotational body; selecting three arbitrary points among all the measurement points to calculate a calculated circle from the radial displacement amounts and measured angles; calculating calculated circle values for all the measurement points from the calculated circle; calculating differences between the calculated circle values and the radial displacement amounts as error amounts at the measurement points; summing the error amounts to derive a total error amount value; repeating calculation for combinations of three measurement points among all the measurement points to calculate each total error amount value; selecting a calculated circle with a minimum total error amount value among obtained total error amount values for all combinations as a most probable circle; and calculating deviation between the center of the most probable circle and the center of rotation of the rotational body as misalignment data of the most probable circle.

In a second solution, the misalignment data of the most probable circle includes a misalignment amount and a misalignment angle in the first solution.

In a third solution, a measured value at a measurement point corresponding to a most probable circle error amount that is a difference between the calculated circle value and the radial displacement amount on the most probable circle is recognized as an abnormal value when the most probable circle error amount exceeds a reference value in the first or second solution.

In a fourth solution, the measured value recognized as the abnormal value is remeasured to obtain a remeasured value and the measured value is replaced with the remeasured value when the most probable circle error amount exceeds the reference value in the third solution.

In a fifth solution, the rotational body is a gas turbine rotor in any of the first to fourth solutions.

A sixth solution provides a system for calculating misalignment of a rotational body, including: an input part that sets at least four or more measurement points in one turn of the rotational body; a deflection amount detection part that derives radial displacement amounts of the rotational body for at least four or more measurement points along an outer surface in a circumferential direction of the rotational body based on measured values measured by a displacement gauge; a storage part that stores the radial displacement amounts derived by the deflection amount detection part and measured angles at the measurement points; and a calculation part that calculates misalignment data of a most probable circle of the rotational body based on data stored in the storage part, wherein the calculation part selects three arbitrary points among all the measurement points stored in the storage part to calculate a calculated circle from the radial displacement amounts and the measured angles, calculates calculated circle values for all the measurement points from the calculated circle, calculates differences between the calculated circle values and the radial displacement amounts as error amounts at the measurement points, sums the error amounts to derive a total error amount value, repeats calculation for combinations of three measurement points among all the measurement points to calculate each total error amount value, selects a calculated circle with a minimum total error amount value among obtained total error amount values for all combinations as a most probable circle, and calculates deviation between the center of the most probable circle and the center of rotation of the rotational body as misalignment data of the most probable circle.

In a seventh solution, the calculation part includes an abnormal value determination part that recognizes, as an abnormal value, a measured value at a measurement point corresponding to a most probable circle error amount that is a difference between the calculated circle value and the radial displacement amount on the most probable circle when the most probable circle error amount exceeds a reference value in the sixth solution.

In an eighth solution, the calculation part includes a measured value updating part that calls up a remeasured value obtained by the deflection amount detection part from the storage part and replaces the measured value with the remeasured value when the most probable circle error amount exceeds the reference value in the seventh solution.

With the configuration in the first solution, the misalignment data of the most probable circle can be calculated by a simple method, thereby facilitating maintenance work such as disassembly and assembly of the rotational body.

With the configuration in the second solution, the misalignment data of the most probable circle can be specified by the misalignment angle and the misalignment amount, thereby facilitating judging validity of the data.

With the configuration in the third solution, whether the measured value is the abnormal value or not can be easily determined when the most probable circle error amount exceeds the reference value, thereby facilitating maintenance work.

With the configuration in the fourth solution, remeasurement can be immediately performed and the measured value can be replaced with the remeasured value when the most probable circle error amount exceeds the reference value, thereby allowing the abnormal value to be reliably eliminated and increasing reliability of measurement work.

With the configuration in the fifth solution, a simple, reliable measurement method can be used, thereby increasing reliability of routine examination work of a gas turbine.

With the configuration in the sixth solution, a simple, reliable system for calculating misalignment of a rotational body can be provided.

With the configuration in the seventh solution, whether the measured value is the abnormal value or not can be easily determined, thereby providing a system with easy maintenance.

With the configuration in the eighth solution, the abnormal value of the measured value can be immediately eliminated, thereby achieving a system with quick, reliable maintenance.

BRIEF DESCRIPTION OF DRAWINGS

FIG. 7 is a diagram showing data in connection with Examples 1 and 2 according to the best mode for carrying out the present invention.

FIG. 9 is a diagram showing a most probable circle error amount at each measurement point in connection with Example 2 according to the best mode for carrying out the present invention.

BEST MODE FOR CARRYING OUT THE INVENTION

An embodiment of the present invention will be described with reference to the drawings, which merely show the embodiment by way of example, and the claimed invention is not limited to the embodiment. Components in the embodiment include components easily replaceable by those skilled in the art, or substantial equivalents.

A basic idea of the present invention will be described below with regard to a method for calculating misalignment of a rotational body.

Figure 1:
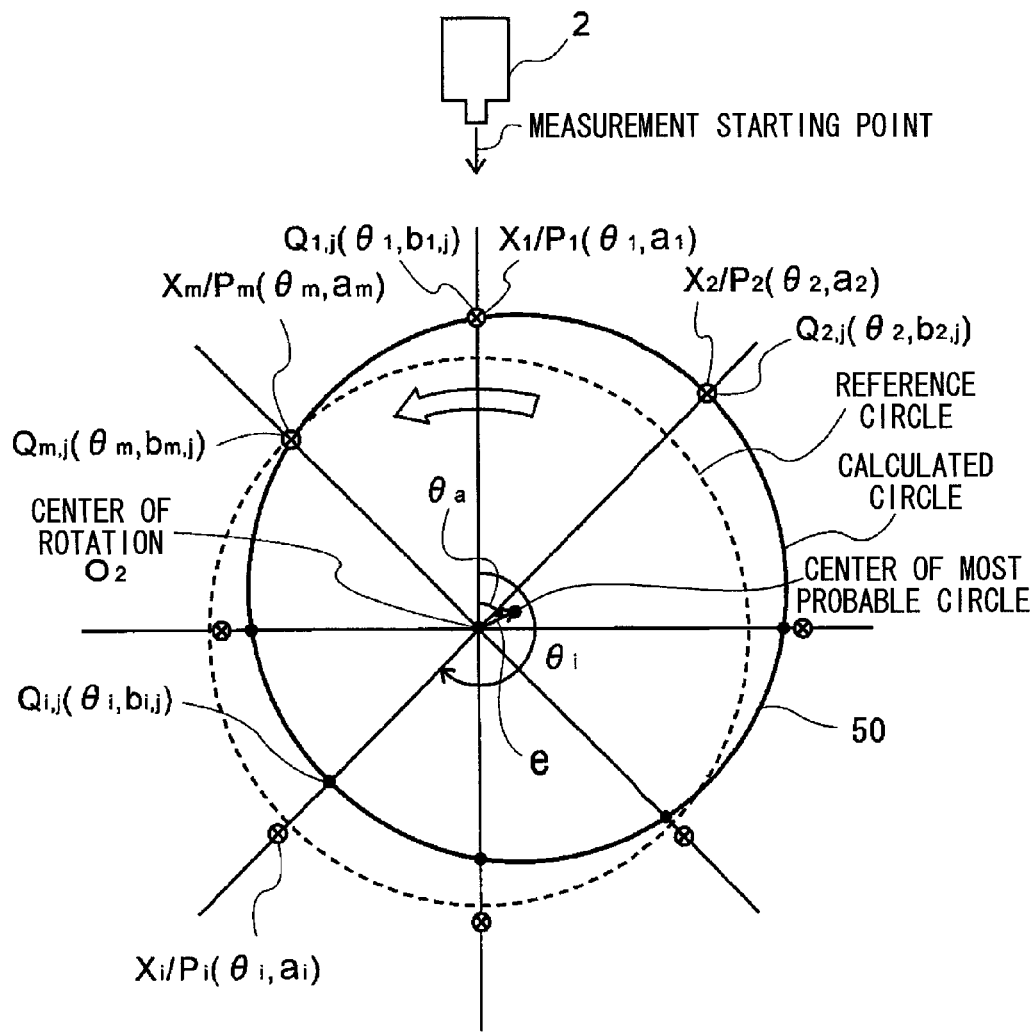
FIG. 1 is a diagram showing a relationship among a measured value, a reference circle, and a calculated circle according to the best mode for carrying out the present invention.

FIG. 1 shows a section of a cylindrical body that is a rotational body (gas turbine rotor), and shows a relationship among a measured value, a reference circle, and a calculated circle on the section. An outer surface of the rotational body is divided in a circumferential direction of the rotational body into a plurality of parts (m) at regular intervals to define measurement points $X_i$ (i=1 to m), and while the rotational body is rotated one turn in the direction of an arrow in FIG. 1, a radial displacement amount $a_i$ of the rotational body on an outer surface of the rotational body is derived based on a measured value (a distance between a placement position of a displacement gauge 2 and the outer surface of the rotational body) measured by the displacement gauge 2 at each measurement point $X_i$.

The measurement points $X_i$ may or may not be selected at regular intervals.

It may be conceivable that a pitch angle is input such that the number of measurement points m in one turn of the rotational body is four or more (also including the case of the number of pulses of the rotation indicator 3), and the measurement points $X_i$ (rotation angles $\theta_i$) are set at regular intervals based on the pitch angle. In this case, an angle at the last measurement point $X_m$ and the first measurement point $X_1$ in one turn of the rotational body may be different from the pitch angle. Further, at least four or more measurement points $X_i$ (rotation angles $\theta_i$) may be directly input and set. It may be also conceivable that the number of measurement points m is input such that the number of measurement points m in one turn of the rotational body is four or more, and the measurement points $X_i$ (i=1 to m) are set based on the number of measurement points m.

A reference circle is not an element directly related to a configuration of the present invention, but is shown for convenience as a circle having the center of figure that matches the center of rotation $O_2$ of the rotational body. When the rotational body is a rotor for a rotating machine, the reference circle is a perfect circle, and the center of the reference circle is the center of rotation $O_2$ of the rotor.

The calculated circle is determined from a measured value $P_i$ (measured angle $\theta_i$ and radial displacement amount $a_i$) of a deflection amount at each measurement point $X_i$. Measurement points $X_i$ (and a measured angle $\theta_i$) are determined for the number of measurement points m in a circumferential direction, and measured values $P_i$ of three arbitrary points are selected from measured values $P_i$ at the measurement points $X_i$, and thus these three points can always determine one circle. The circle determined by the three points is regarded as the calculated circle. The calculated circle is determined by a combination of three arbitrary measurement points $X_i$ among m measurement points $X_i$ and there are a total of $(_mC_3)$ combinations. $(_mC_3)$ means a total number of combinations of all three points when three arbitrary points are selected from m measurement points $X_i$. Thus, when n=$(_mC_3)$, there are n calculated circles.

In the present invention, three arbitrary points are selected from all the measurement points $X_i$ (i=1 to m), and one calculated circle is calculated from the three points. Next, for each of the measurement points $X_i$, radial deviation between each measured value P and the calculated circle, that is, a difference between each radial displacement amount $a_i$ and a calculated circle value (the meaning of the calculated circle value will be described later) is calculated as an error amount $\Delta_{i,j}$. A total error amount value $\Delta S_j$ is calculated from each error amount $\Delta_{i,j}$. Then, calculated circles are successively calculated from the combinations of three points among all the measurement points $X_i$ (i=1 to m), and a total error amount value $\Delta S_j$ is similarly calculated for each calculated circle.

After the total error amount values $\Delta S_j$ are calculated for all the calculated circles, a minimum one of all the total error amount values $\Delta S_j$ (j=1 to n) is selected as a minimum total error amount value $\Delta S_j$ (j=a), and a calculated circle corresponding to the minimum total error amount value $\Delta S_a$ is determined as a most probable circle. The most probable circle is regarded as a figure closest to a sectional shape of the rotational body among all the calculated circles, and the center of the most probable circle is regarded as the center of figure. Deviation between the center of the most probable circle and the center of rotation $O_2$ is misalignment (eccentric distance e). Misalignment data of the most probable circle including an eccentric distance e and a misalignment angle $\theta_a$ quantitatively indicates a state of the misalignment. Calculation of the eccentric distance e and the misalignment angle $\theta_a$ allows the level of the misalignment of the rotational body to be easily determined, and allows validity of the data to be easily determined.

For each calculated circle, one error amount $\Delta_{i,j}$ is calculated at each measurement point $X_i$, and one total error amount value $\Delta S_j$ can be calculated for each calculated circle. One most probable circle is determined for all the measurement points $X_i$ (i=1 to m).

The above-described method will be more specifically described with reference to FIG. 1. In FIG. 1, each measured value at each measurement point $X_i$ is denoted by $P_i$ ($\theta_i$, $a_i$). Reference character i is selected from any one of 1 to m, and the measurement point $X_i$ means an i-th measurement point from the measurement starting point ($X_1$). Reference character $\theta_i$ denotes a clockwise measured angle at the measurement point $X_i$ from the measurement starting point ($X_1$), and reference character $a_i$ denotes the aforementioned radial displacement amount at the measurement point $X_i$.

From a combination of three arbitrary measurement points, one calculated circle can be determined by a method described later (Expression 4). From the combinations of three arbitrary points among all the measurement points, n calculated circles can be ultimately determined by the same method.

Next, the meaning of the calculated circle value $Q_{i,j}$ will be described with reference to FIG. 1. The calculated circle value $Q_{i,j}$ is a value on one calculated circle selected from three arbitrary measurement points among all the measurement points $X_i$ (i=1 to m). The calculated circle value $Q_{i,j}$ is a value calculated from the calculated circle and having the same measured angle $\theta_i$ as a point corresponding to the measurement point $X_i$ that is, the measurement point $X_i$. The calculated circle value $Q_{i,j}$ is denoted by reference character $Q_{i,j}$ ($\theta_i$, $b_{i,j}$). Similarly to the above, reference character $\theta_i$ denotes a clockwise measured angle from the measurement starting point ($X_1$) at the measurement point $X_i$, and reference character $b_{i,j}$ denotes a calculated value on a calculated circle with a measured angle of $\theta_i$. When the calculated circle is determined, the calculated circle value $Q_{i,j}$ ($\theta_i$, $b_{i,j}$) can be calculated from the calculated circle and the measured angle $\theta_i$. For m measurement points, there are n calculated circles, and for reference characters i and j indicated below, the reference character i denotes any one of 1 to m and the reference character j denotes a point selected from any one of 1 to n. Specifically, the reference character i denotes a rank number of the measurement point from the measurement starting point ($X_1$) for the m measurement points, and the reference character j denotes a rank number of a target calculated circle for n calculated circles.

When a difference from each calculated circle value $Q_{i,j}$ ($\theta_i$, $b_{i,j}$) corresponding to each measured value $P_i$ ($\theta_i$, $a_i$) is an error amount $\Delta_{i,j}$ at each measurement point $X_i$, the error amount $\Delta_{i,j}$ is expressed by Expression 1.

$$\Delta_{i,j}=[P_i(\theta_i,a_i)-Q_{i,j}(\theta_i,b_{i,j})]^2 \qquad \text{(Expression 1)}$$

In Expression 1, a difference between the measured value $P_i$ and the calculated circle value $Q_{i,j}$ is squared so that an influence of plus and minus signs of the value of the difference is eliminated, and in view of a case where the measured value includes an abnormal value, a difference between the abnormal value and a normal value is further enlarged to achieve easy selection of the abnormal value.

Then, for a target calculated circle, an error amount $\Delta_{i,j}$ is calculated for all the measurement points $X_i$ (i=1 to m) by Expression 1.

Further, for a target calculated circle, the error amounts $\Delta_{i,j}$ are summed. The total error amount value $\Delta S_j$ is expressed by Expression 2.

$$\Delta S_j=\Sigma(\Delta_{i,j}) \qquad \text{(Expression 2)}$$

For a target calculated circle, the error amounts $\Delta_{i,j}$ at each measurement point in Expression 1 are summed from the measurement point $X_1$ to the measurement point $X_m$ to obtain the total error amount value $\Delta S_j$.

Then, other different calculated circles are determined from combinations of other three arbitrary points among the measurement points in the same manner. Further, using Expressions 1 and 2, an error amount $\Delta_{i,j}$ and a total error amount value $\Delta S_j$ are calculated for each calculated circle. Since one total error amount value $\Delta S_j$ can be calculated for each calculated circle, n total error amount values $\Delta S_j$ can be calculated for n calculated circles.

Figure 13:
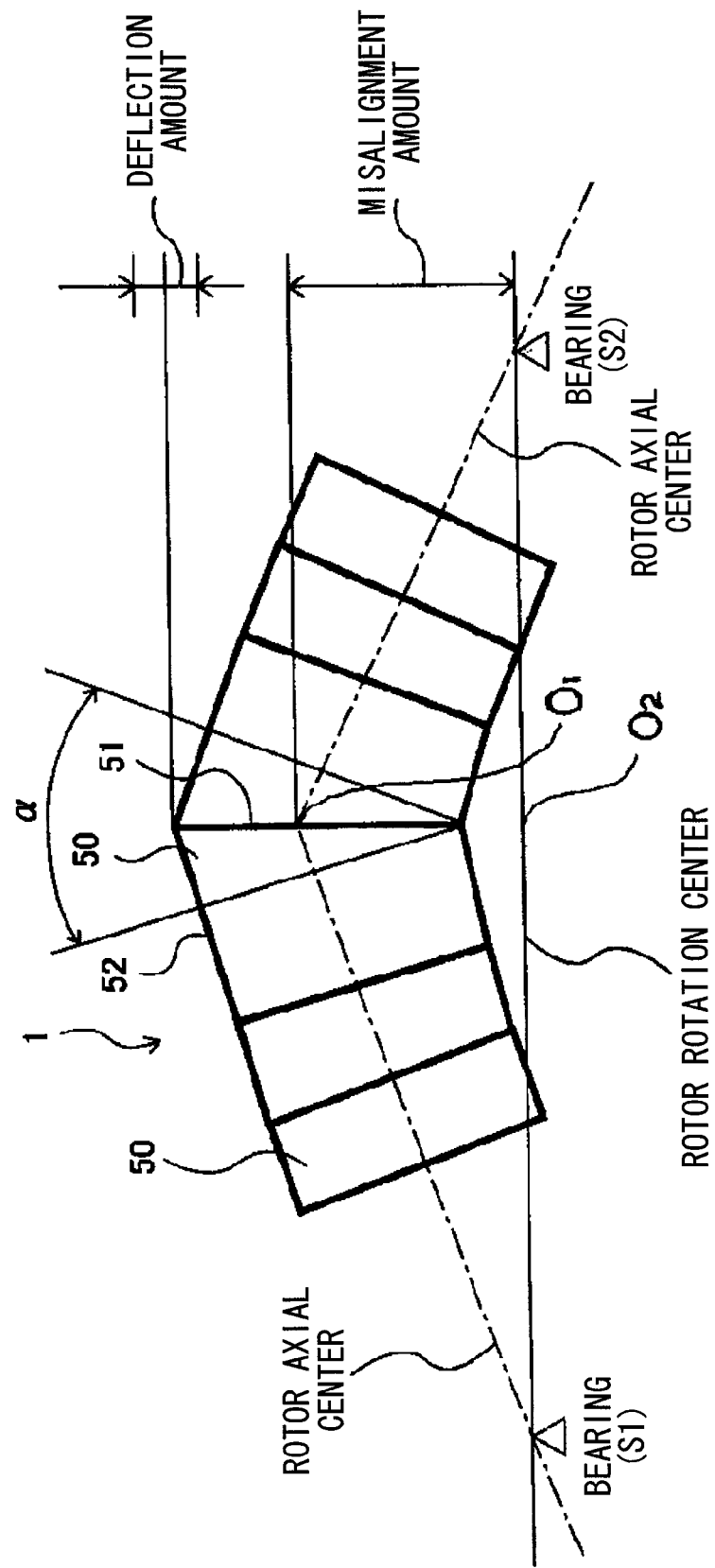
FIG. 13 is a diagram showing a state where the axial deformation of the gas turbine rotor occurs.

After the total error amount values $\Delta S_j$ for the n calculated circles are calculated, a minimum total error amount value is selected among the total error amount values $\Delta S_j$, and a calculated circle having the minimum total error amount value is determined as a most probable circle. The most probable circle is regarded as a figure closest to a sectional shape of the rotational body among all the calculated circles, and the center of the most probable circle is regarded as the center of figure. Deviation between the center of the most probable circle and the center of rotation $O_2$ of the rotational body is misalignment. In FIG. 1, an eccentric distance e that is a distance between the center of rotation $O_2$ of the rotational body and the center of the most probable circle is a misalignment amount. An angle $\theta_a$ indicating a clockwise misalignment direction from the measurement starting point is a misalignment angle. The center of rotation $O_2$ means the same as the center of rotation $O_2$ of the rotor shown in FIG. 13 as described above.

If the misalignment is determined in such a way, data can be obtained by a simpler method than a least squares method that is a conventional art disclosed in Patent Citations 1 and 2.

If the measured value includes an abnormal value, the abnormal value is reliably eliminated in the calculation process of the most probable circle. Specifically, the calculated circle is a circle determined by measured values of three arbitrary points, and there is always a calculated circle that does not include an abnormal value. Thus, from the calculated circles that do not include an abnormal value, a circle with a minimum total error amount value is naturally selected as the most probable circle. Since the abnormal value can be specified, the abnormal value can be eliminated and replaced with a measured value (remeasured value) after remeasurement. On the other hand, in the least squares method and the like that are the conventional arts disclosed in Patent Citations 1 and 2, calculation of misalignment involves an abnormal value, and there is always an influence of the abnormal value. Also, the abnormal value cannot be specified, and thus it is difficult to eliminate the abnormal value and replace the abnormal value with a remeasured value.

Next, the outline of a method for calculating a calculated circle from a measured value to quantitatively evaluate an error amount using a plane coordinate will be described below.

Figure 3:
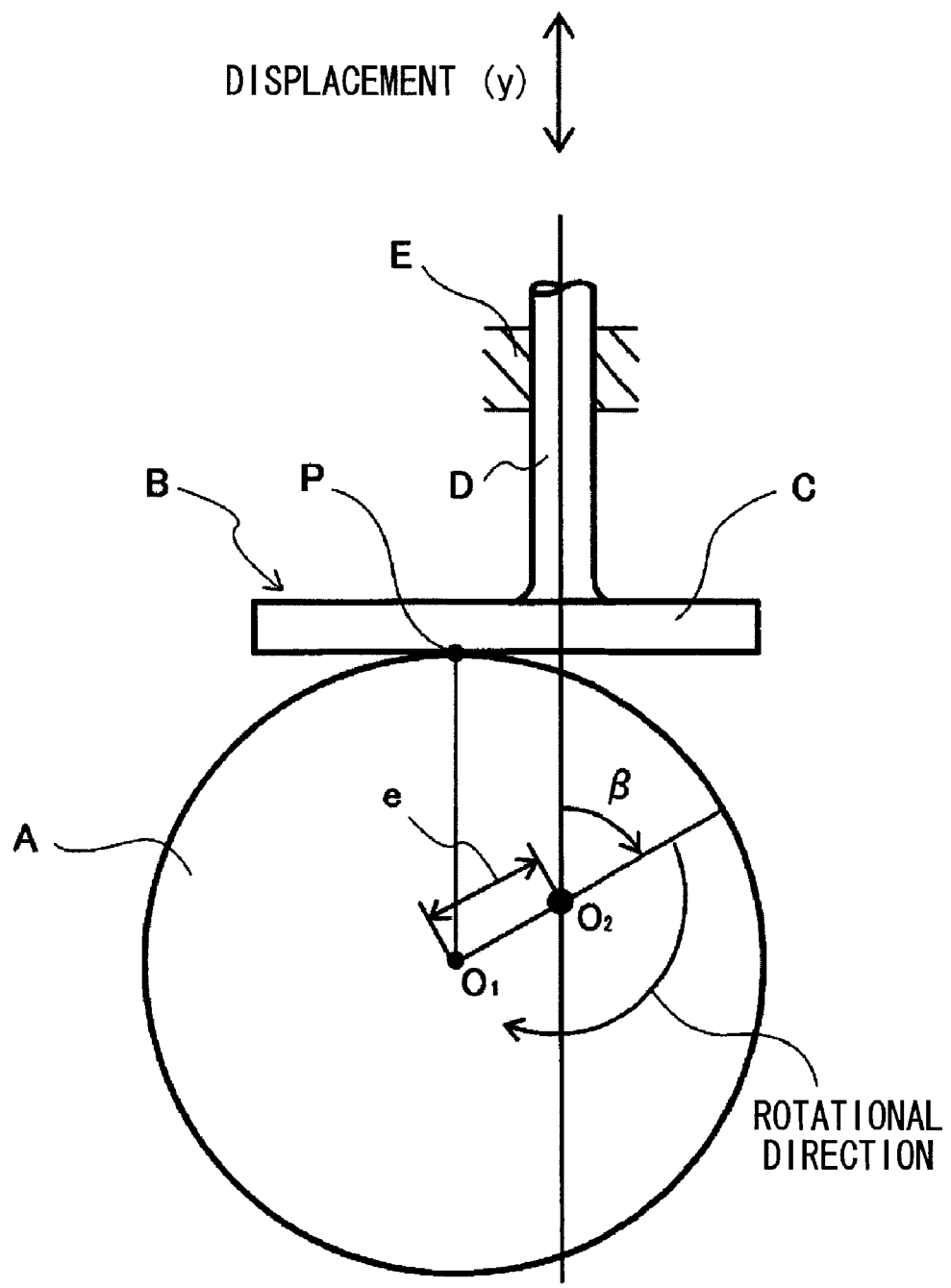
FIG. 3 is a conceptual view showing an eccentric disk cam.

Changes in deflection when the rotational body having misalignment is rotated can be approximated to deflection of an eccentric disk cam. FIG. 3 is a conceptual view of an eccentric disk cam. In FIG. 3, the eccentric disk cam includes a rotary disk A and a follower B, and the follower B includes a flat plate C and a shaft part D secured thereto. The follower B is in contact with a peripheral surface of the rotary disk A at a contact point P via the flat plate C. The follower B has a structure in which the shaft part D can be moved only in an axial direction (vertical direction on the sheet surface in FIG. 3) in a restraining member E, and the entire follower B can be moved in the vertical direction with rotation of the rotary disk A. Further, the rotary disk A rotates around the center of rotation $O_2$ eccentric from the center of figure $O_1$ by an eccentric distance e. In such an eccentric disk cam, when the rotary disk A rotates around the eccentric center of rotation $O_2$, the follower B moves in the vertical direction with respect to the sheet surface with changes in rotation angle β.

Figure 4:
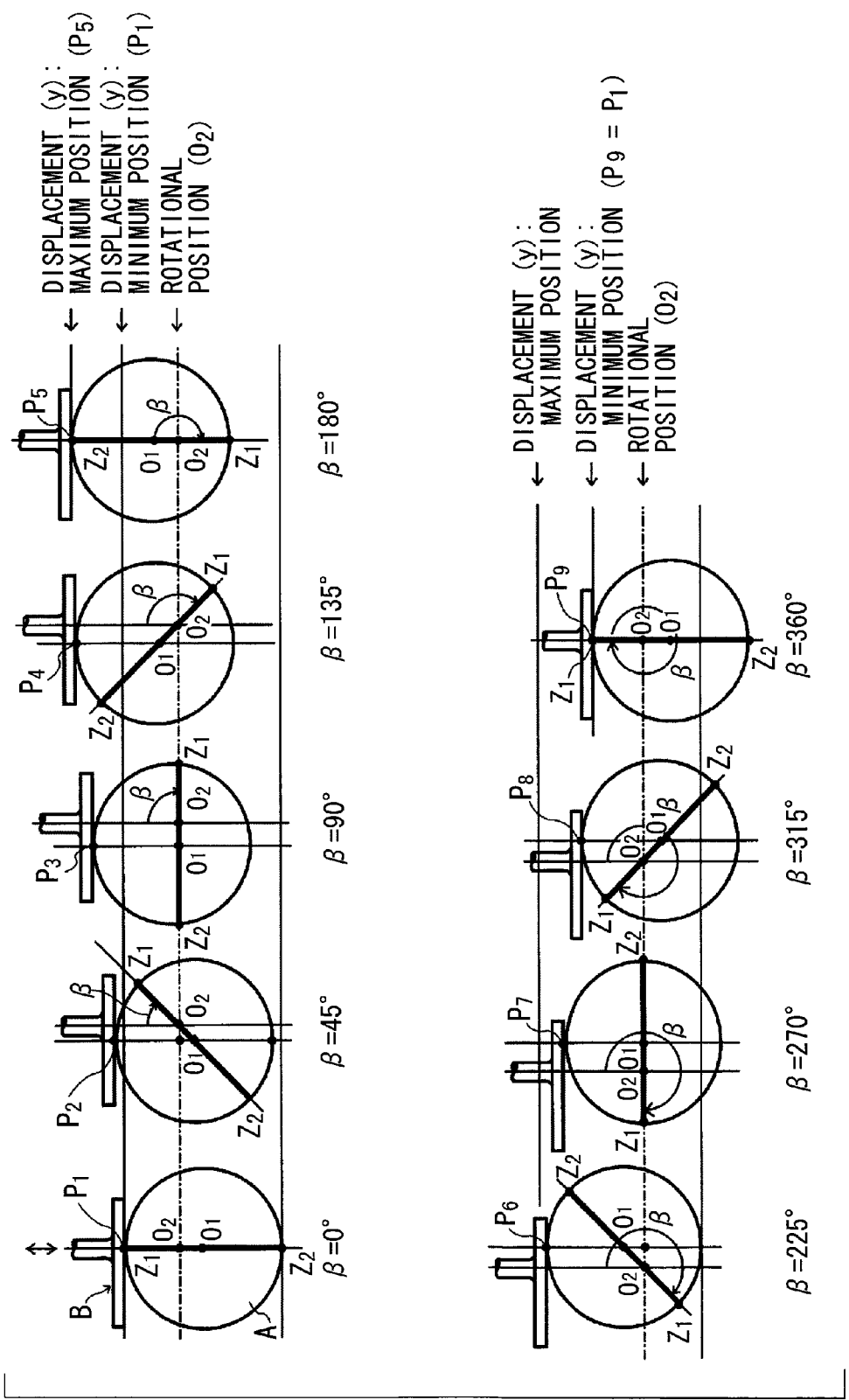
FIG. 4 is a diagram showing a relationship between a rotation angle and displacement of a contact point of the eccentric disk cam.

FIG. 4 shows changes of the contact point P with movement of the rotary disk A. FIG. 4 shows a state where when the rotary disk A rotates around the center of rotation $O_2$ and the rotation angle β changes clockwise from 0° to 360° in 45° increments, the contact point P changes in the vertical direction from a contact point $P_1$ to a contact point $P_9$ with respect to the rotation angle β.

In FIG. 4, a state with a rotation angle β of 0° means a state where the center of disk $O_1$, the center of rotation $O_2$, and an axis of the shaft part D matches in the vertical direction (on the sheet surface), and the center of rotation $O_2$ is located between the contact point P ($P_1$) and the center of disk $O_1$. In this state, chord $Z_1Z_2$ that forms a diameter of the rotary disk A is located on a vertical line on which the center of disk $O_1$, the center of rotation $O_2$, and the axis of the shaft part D match in the vertical direction with respect to the sheet surface. The rotation angle β that changes with rotation of the rotary disk A is indicated by a clockwise angle formed by the chord $Z_1Z_2$ and the vertical line (vertical line with respect to the sheet surface connecting the center of rotation $O_2$ and the axis of the shaft part D).

In FIG. 4, for a relative positional relationship in the vertical direction of the contact point P with respect to the center of rotation $O_2$, the position of the contact point P vertically moves with changes in the rotation angle β. The locus of the contact point P draws a sine curve (which may be referred to as a cosine curve) as described later. At a position of the rotation angle β of 0°, the height of the contact point P ($P_1$) is a minimum value (a vertical distance between the flat plate C and the center of rotation $O_2$ is minimum), and at a position of the rotation angle β of 180°, the contact point P ($P_5$) represents a maximum value (the vertical distance between the flat plate C and the center of rotation $O_2$ is maximum).

A difference between the maximum value ($P_5$) and the minimum value ($P_1$) of displacement of the contact point P is a maximum deflection width. The deflection width is twice the misalignment amount of the rotary disk A, that is, the eccentric distance e between the center of figure $O_1$ and the center of rotation $O_2$ of the rotary disk A. The rotation angle β in FIG. 4 is synonymous with the measured angle θ in FIG. 1, and the rotation angle β will be replaced with the measured angle θ in the description below.

When the displacement of the follower B of the eccentric disk cam, that is, the vertical displacement of the contact point P is y, the displacement y is expressed by Expression 3.

$$y = e(1-\cos\theta) \quad \text{(Expression 3)}$$

Expression 3 expresses the displacement of the follower B when the rotary disk A is rotated by the measured angle θ, that is, the displacement of the contact point P, which is indicated by a sine curve passing the origin point of a y-θ coordinate. The state with the measured angle θ of 0° as described above means a state where the center of disk $O_1$, the center of rotation $O_2$, and the axis of the shaft part D match, and means a position with minimum displacement of the contact point P. The displacement y at this time is zero. It can be considered that the displacement y of the contact point P corresponds to a change in radial deflection of the rotational body with the misalignment in the present invention.

The radial deflection amount of the rotational body is measured in such a manner that displacement at the measurement starting point is regarded as zero, and displacements at other measurement points are measured as changes of readings of the displacement gauge with reference to the measurement starting point. Meanwhile, in Expression 3, when the measured angle θ is 0°, the displacement y is zero. Generally, for measurement of circularity of the rotational body having misalignment, a position with the measured angle θ of zero (position with the minimum displacement) is unclear at the start of measurement. Thus, actual measurement is started when the measured angle θ is $θ_a$ and the displacement y is $y_a$, and this point is regarded as the measurement starting point ($X_1$). Coordinate transformation of Expression 3 is performed so that the measured angle at this time is 0° and the displacement Y is zero.

An expression of deflection after the coordinate transformation is expressed by Expression 4 on an X-Y coordinate.

$$Y = e[1-\cos(X+\theta_a)]-y_a \quad \text{(Expression 4)}$$

This expression is an expression of deflection that forms the basis for a misalignment calculation method according to the present invention. The measured angle X means a measured angle (rotation angle) from the measurement starting point. The displacement Y means a displacement amount at the measured angle X. The angle $θ_a$ is referred to as an initial angle, and the displacement $y_a$ is referred to as initial displacement. The eccentric distance e between the center of rotation $O_2$ and the center of figure $O_1$ of the eccentric disk cam shown in FIG. 3 corresponds to the amplitude of the sine curve in Expression 4 (½ of the entire deflection width).

The measured values at the three measurement points are assigned to variables X and Y in Expression 4 to define constants e, $θ_a$ and $y_a$, and determine an expression of one calculated circle.

Figure 2:
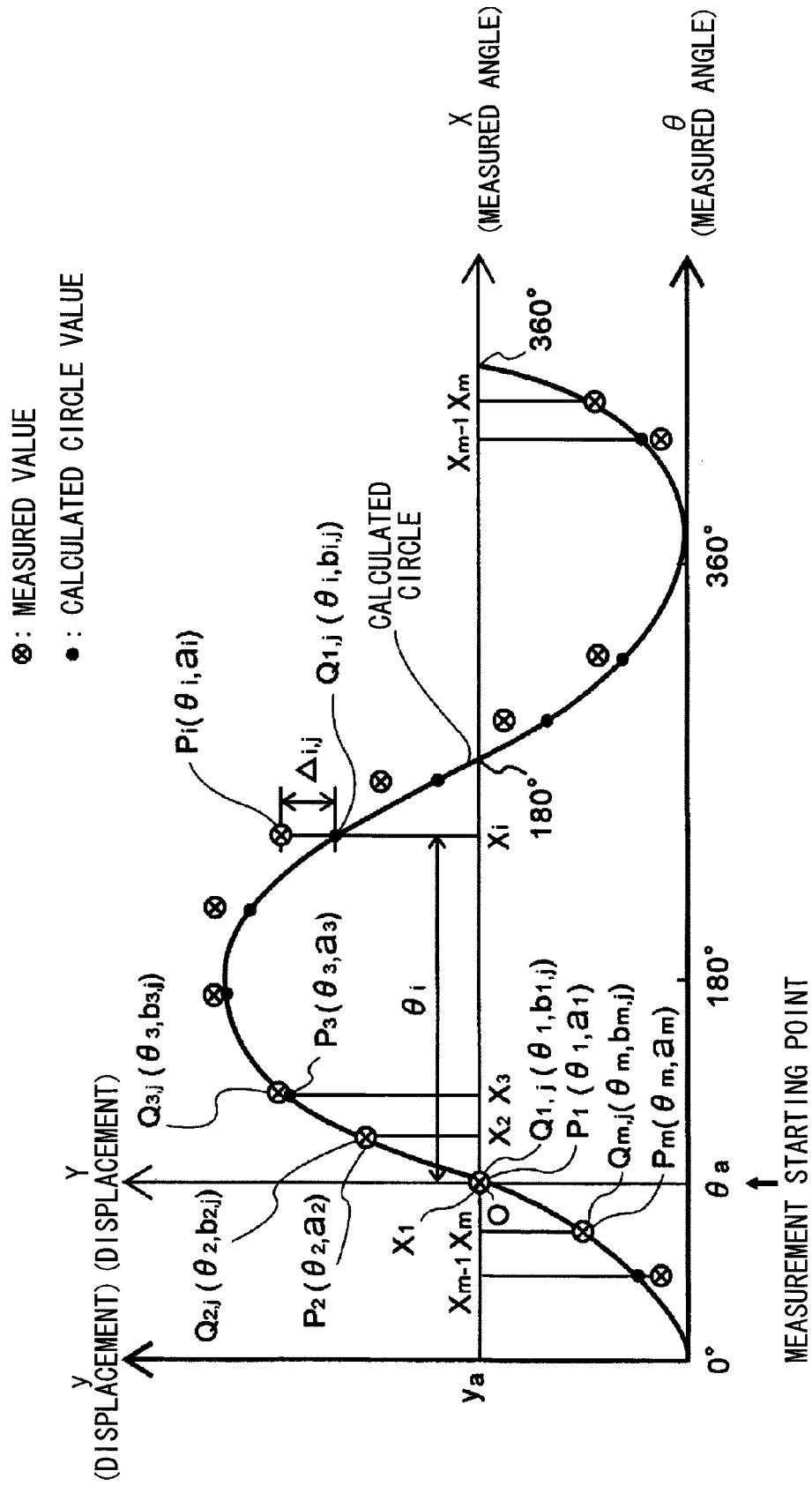
FIG. 2 is a diagram showing a relationship among a measured value, a reference circle, and a calculated circle on an X-Y coordinate.

FIG. 2 shows a relationship among the measured value of the rotational body, the reference circle, and the calculated circle shown in FIG. 1, developed on an X-Y coordinate. In FIG. 2, the abscissa X represents the measured angle from the measurement starting point, and the ordinate Y represents displacement at the measurement point. The expression of deflection expressed by Expression 4 is indicated by a sine curve passing the origin point O on the X-Y coordinate shown in FIG. 2.

In FIG. 2, the calculated circle is shown by a solid line. The reference circle is a perfect circle, and it is considered that the displacements at all the measured angles are zero, and thus the reference circle matches the X axis. The origin point O is the measurement starting point. The measurement points in the circumferential direction of the rotational body are indicated as the measurement points $X_i$ corresponding to the measured angles $θ_i$ by dividing the X-axis into m parts between 0° to 360° on the X-Y coordinate. The measured value $P_i$ at each measurement point $X_i$ is an actual measured value. A relationship between the y-θ coordinate and the X-Y coordinate that are original coordinates is a relationship with a deviation by the measured angle of $θ_a$ on the X-axis and the displacement of $y_a$ on the Y-axis. The amplitude of the sine curve (½ of the entire deflection width) corresponds to the misalignment amount. The initial angle $θ_a$ corresponds to the misalignment angle.

As described above, the calculated circle determined by the three arbitrary measurement points in FIG. 1 being developed on the X-Y coordinate corresponds to the locus of the calculated circle shown in FIG. 2. In FIG. 1, the calculated circle determined by the three measured values $P_1$, $P_2$ and $P_m$ at the measurement points $X_1$, $X_2$ and $X_m$ is shown by way of example. The calculated circle shown in FIG. 2 is the calculated circle in FIG. 1 being developed and shown as a sine curve on the X-Y coordinate. FIGS. 1 and 2 show only one calculated circle (j-th calculated circle), but there are actually n calculated circles determined by Expression 4.

Further, the error amount $\Delta_{i,j}$ expressed by Expression 1 is indicated as a difference between the measured value $P_i$ and the calculated circle value $Q_{i,j}$ on the calculated circle in FIG. 2. Specifically, the measured value of the deflection amount is indicated by $P_i$ ($\theta_i$, $a_i$) at the measurement point $X_i$ (measured angle $\theta_i$) on the X-axis. The calculated circle value on the calculated circle is indicated by $Q_{i,j}$ ($\theta_i$, $b_{i,j}$). Thus, the error amount $\Delta_{i,j}$ can be indicated as a difference between the measured value $P_i$ ($\theta_i$, $a_i$) and the calculated circle value $Q_{i,j}$ ($\theta_i$, $b_{i,j}$). As described above, the error amount $\Delta_{i,j}$ is a square of the difference between the measured value and the calculated circle value as expressed in Expression 1 in view of different plus and minus signs of the differences between the measured values and the calculated circle values and easy selection of the abnormal value.

Then, the error amount $\Delta_{i,j}$ is calculated to determine a total error amount value $\Delta S_j$. After the total error amount value $\Delta S_j$ is calculated for each calculated circle, a minimum total error amount value $\Delta S_j$ (j=a) is selected, and thus the calculated circle having the minimum total error amount value $\Delta S_a$ is the most probable circle.

A difference between the center of the most probable circle finally selected and the center of rotation $O_2$ (the center of the reference circle) is misalignment data of the most probable circle. Specifically, the misalignment data of the most probable circle is expressed by the misalignment amount and the misalignment angle. In FIG. 2, the misalignment amount is calculated as the amplitude of the sine curve of the most probable circle, and the misalignment angle is calculated as an initial angle $\theta_a$. The misalignment amount and the misalignment angle thus determined are the misalignment data of the most probable circle calculated according to the present invention.

If the number of measurement points m in one turn of the rotational body in the circumferential direction is increased, calculation accuracy of the misalignment is improved but an amount of calculation is increased. Meanwhile, if the number of measurement points m is reduced, calculation accuracy of the misalignment is reduced. However, from the idea of the present invention, the number of measurement points m needs to be at least four or more. With three or less partitions, the basic idea of the present invention does not hold.

Figure 5:
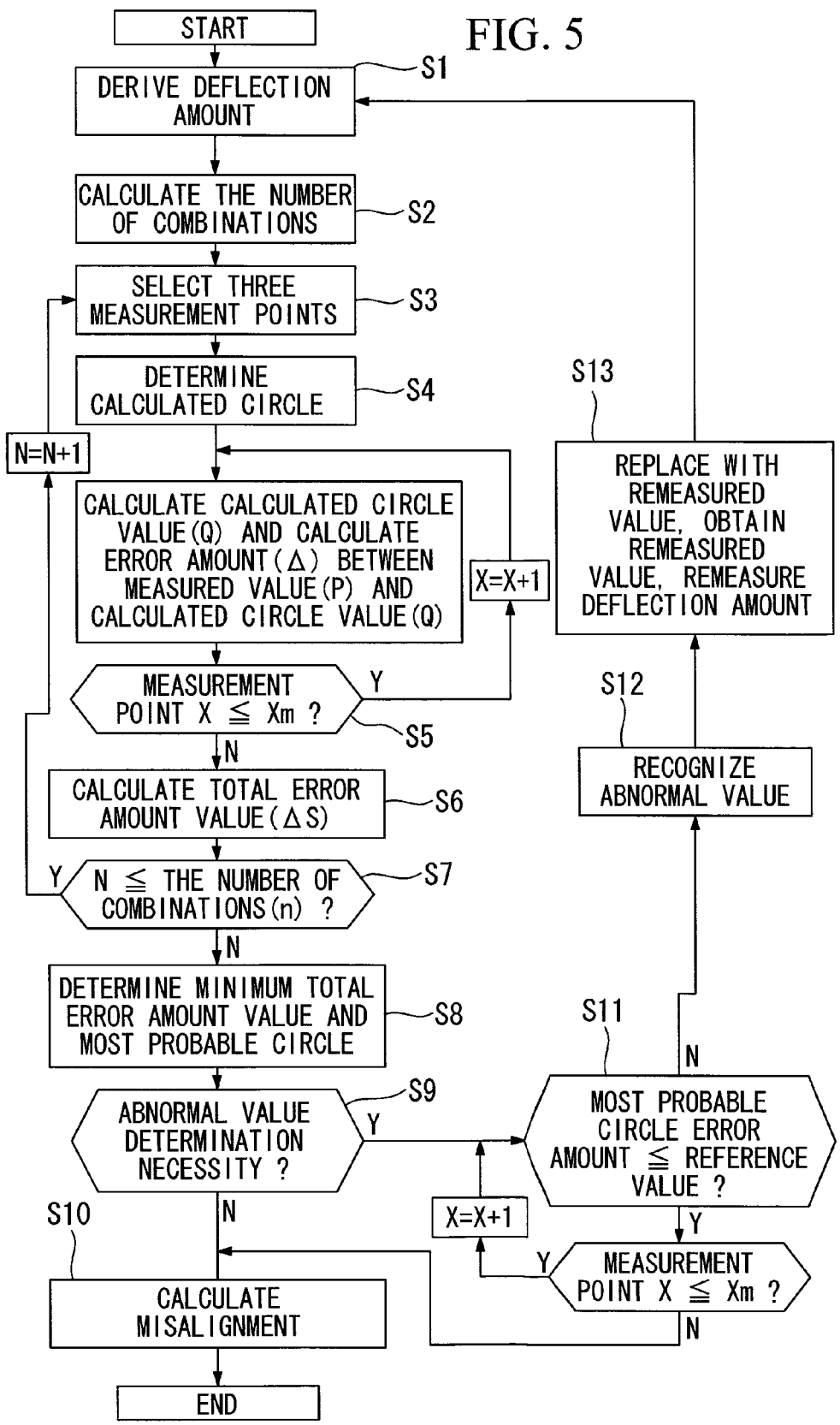
FIG. 5 is a diagram showing a calculation procedure of misalignment according to the best mode for carrying out the present invention.

Next, specific steps of a method for calculating misalignment of the rotational body will be described with reference to FIG. 5.

First, to determine the number of measurement points in the circumferential direction of the rotational body (gas turbine rotor), the number of measurement points m of at least four or more is set (input) in the circumferential direction of the rotational body. From the determined number of measurement points m, each measurement point $X_i$ (rotation angle $\theta_i$) is determined along an outer surface in the circumferential direction of the rotational body.

Then, while the rotational body is rotated, a deflection amount (radial displacement amount $a_i$) of the rotational body is derived by a deflection amount detection part 62 (described later) based on a measured value (a distance between a placement position of a displacement gauge 2 and the outer surface) measured by the displacement gauge 2 at each measurement point $X_i$ (Step S1). Various values may be used as the radial displacement amount $a_i$ as described above.

From the measurement points $X_i$, the number of combinations (the number of calculated circles n) of three measurement points is calculated (Step S2). The number of combinations (the number of calculated circles n) can be determined by n=($_mC_3$).

Arbitrary three measurement points are selected (Step S3). One calculated circle is determined from the selected three points.

Measured values at the selected three points are assigned to Expression 4 to determine the calculated circle (Step S4).

Based on the determined calculated circle, calculated circle values $Q_{i,j}$ ($\theta_i$, $b_{i,j}$) for all the measurement points $X_i$ are calculated. From each measured value $P_i$ ($\theta_i$, $a_i$) and each calculated circle value $Q_{i,j}$ ($\theta_i$, $b_{i,j}$), an error amount $\Delta_{i,j}$ at each measurement point $X_i$ is calculated by Expression 1 (Step S5).

A total error amount value $\Delta S_j$ is calculated for each calculated circle by Expression 2. When this step finishes, calculation of one total error amount value $\Delta S_j$ for one calculated circle is finished (Step S6).

For all combinations of three measurement points among all the number of measurement points m (the number of calculated circles n), the calculation from Steps S3 to S6 is repeated (Step S7). The calculation is repeated for all the number of combinations (the number of calculated circles n), and thus a total error amount value $\Delta S_j$ (j=1 to n) can be calculated for each of n calculated circles.

Then, a minimum total error amount value $\Delta S_j$ (j=a) is selected from n total error amount values $\Delta S_j$ (j=1 to n) to determine a most probable circle (Step S8). When the most probable circle is determined, a calculated circle value corresponding to each measured value for the most probable circle, that is, a most probable circle calculated circle value can be calculated. From the most probable circle calculated circle value and each measured value $P_i$, an error amount between the most probable circle and the measured value, that is, a most probable circle error amount $\Delta_{i,a}$ is determined.

Then, it is determined whether abnormal value determination for each measured value $P_i$ is necessary or not (Step S9).

This procedure is taken for the following reason. Even if the measured value includes an abnormal value, the proper most probable circle is selected and determined. Specifically, a miniscule number of abnormal values generally appear at the number of all measurement points $X_i$. Thus, even if the measured value $P_i$ includes an abnormal value, there is always a combination of three points with the measured value $P_i$ that does not include an abnormal value in the process of calculating the calculated circle by the combination of three arbitrary points. Specifically, there is always a calculated circle that does not include an abnormal value, and thus even if the measured value $P_i$ includes an abnormal value, the most probable circle finally determined is a proper most probable circle that does not include an abnormal measured value $P_i$. Therefore, even if the most probable circle is determined with the measured value $P_i$ including an abnormal value, no problem occurs in determination of the most probable circle. As a result, for simply advancing misalignment calculation work, calculation of misalignment without determination of an abnormal value of each measured value can obtain proper misalignment data of a most probable circle, and the misalignment calculation work can be finished directly.

When abnormal value determination is unnecessary in the process to determine whether abnormal value determination is necessary or not, the misalignment data of the most probable circle is calculated (Step S10) to finish the misalignment calculation work. The misalignment data of the most probable circle is deviation between the center of the most probable circle and the center of rotation $O_2$, and includes an eccentric distance e and a misalignment angle θ. Specifically, the misalignment amount corresponds to the amplitude of a sine curve of the most probable circle, and the misalignment angle $θ_a$ corresponds to an initial angle $θ_a$. A case where, without determining whether the abnormal value determination is necessary or not, the most probable circle is determined, and the misalignment data of the most probable circle is calculated to finish the work is regarded as substantially the same invention as the present invention and falls within the technical scope of the present invention.

When it is determined that abnormal value determination is necessary, a subsequent abnormal value determination part determines which measured value is abnormal. Specifically, the presence of the abnormal value is checked and the abnormal value is recognized in Steps S11 and S12 below.

Specifically, for the determined most probable circle, an error amount corresponding to the most probable circle is selected among the error amounts $Δ_{i,j}$ at the measurement points $X_i$ calculated in Step 7 as a most probable circle error amount $Δ_{i,a}$, and it is determined whether each of the most probable circle error amounts $Δ_{i,a}$ (i=1 to m) is within a reference value or not for all the measurement points $X_i$ (Step S11).

When the most probable circle error amount $Δ_{i,a}$ (for example, i=f) exceeds the reference value, the measured value $P_f$ for the measurement point $X_f$ is recognized as an abnormal value (Step S12).

When all the most probable circle error amounts $Δ_{i,a}$ (i=1 to m) are within the reference value, it is determined that normal measurement has been performed before the misalignment data of the most probable circle is calculated, and the misalignment calculation work is finished (Step S10). The misalignment data of the most probable circle is a deviation length between the center of the most probable circle and the center of rotation, and includes a misalignment amount (eccentric distance e) and a misalignment angle $θ_a$. Specifically, the misalignment amount corresponds to the amplitude of the sine curve of the most probable circle, and the misalignment angle corresponds to the initial angle $θ_a$.

When the measured value $P_f$ is recognized as an abnormal value, a subsequent measured value updating part reviews all the measured values $P_i$ (i=1 to m). Specifically, the measured value updating part causes the displacement gauge 2 and the deflection amount detection part 62 (and further the rotation indicator 3) to perform remeasurement for all the measurement points $X_i$ (i=1 to m), and obtains a remeasured value to replace the measured value $P_i$ (i=1 to m) with the remeasured value (Step S13).

When updating the measured value $X_i$ (i=1 to m) is finished, the process returns to Start, and recalculation is performed. The calculation procedure in Step S1 to S9 in FIG. 5 is repeated until the most probable circle error amounts $Δ_{i,a}$ (i=1 to m) falls within the reference value, and when the most probable circle error amounts $Δ_{i,a}$ fall within the reference value, the misalignment calculation procedure is finished.

When an abnormal value appears, remeasurement may be performed for only the measurement point $X_f$ with the abnormal value instead of remeasurement for all the measurement points $P_i$ (i=1 to m). Specifically, remeasurement is performed for the specified measurement point $X_f$, an error amount $Δ_{f,a}$ is recalculated by Expression 1 based on the measured value $P_f$ after replacement, and the most probable circle error amount $Δ_{i,a}$ (i=1 to m) is calculated based on a calculated circle value calculated from the most probable circle and a remeasured value after the replacement. It is sufficient to confirm that the most probable circle error amount $Δ_{i,a}$ (i=1 to m) falls within the reference value.

Figure 6:
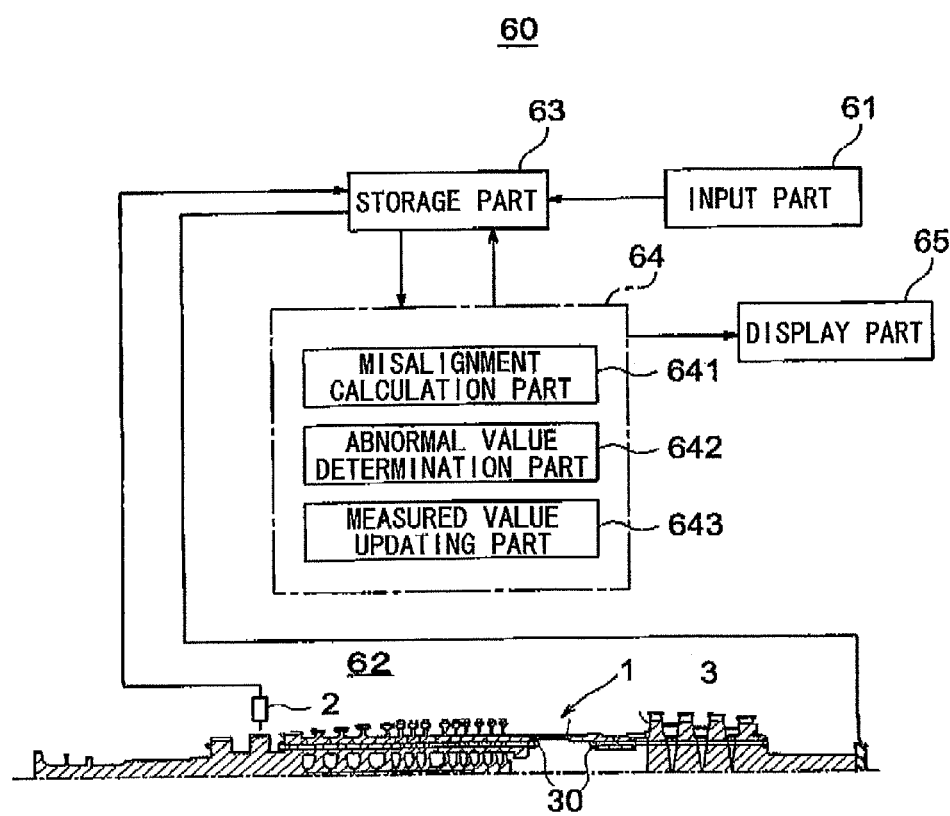
FIG. 6 is a diagram showing a configuration of a system for calculating misalignment.

Next, a configuration of a system for calculating misalignment of the rotational body will be described with reference to FIG. 6. The system 60 for calculating misalignment includes the gas turbine rotor 1 (rotational body), the displacement gauge 2, the rotation indicator 3, an input part 61, a deflection amount detection part 62, a storage part 63, a calculation part 64, and a display part 65.

The input part 61 inputs initial values required for starting misalignment calculation work, such as the number of circumferentially divided sections (the number of measurement points m) of the gas turbine rotor 1 (rotational body) for selecting the number of measurement points, a pitch angle such that the number of measurement points m is four or more (also including the case of the number of pulses of the rotation indicator 3), or four or more measurement points $X_i$ (rotation angles $θ_i$).

The deflection amount detection part 62 selects or derives at least four or more measurement points $X_i$ in one turn of the gas turbine rotor 1 in the circumferential direction along the outer surface of the rotational body. The displacement gauge 2 is placed close to the outer surface of the gas turbine rotor 1. A drive source (not shown) for rotating the rotational body and the rotation indicator 3 in a gas turbine apparatus may be herein used. While the gas turbine rotor 1 is rotated, a measured value at each measurement point $X_i$ from the displacement gauge 2 is read, and the measured value is stored in the storage part 63 as a radial displacement amount $a_i$. A measured value from the rotation indicator 3 is also stored in the storage part 63 as a measured angle $θ_i$ as required (not required when the measured angle $θ_i$ has been already set). Misalignment data to be measured includes a radial displacement amount $a_i$ and a measured angle $θ_i$ (rotation angle). As the displacement gauge 2, various known sensors are applied. For example, a contact sensor such as a dial gauge, or a noncontact sensor such as a laser sensor, a capacitance sensor, or an ultrasonic sensor can be used.

Each measurement point $X_i$ of the gas turbine rotor 1 is selected by previously marking off measurement positions of all the measurement points $X_i$ on the outer surface of the gas turbine rotor 1. For a radial displacement amount $a_i$ at each measurement point $X_i$, a reading of the displacement gauge 2 is automatically captured as the measured value when the gas turbine rotor 1 is rotated at low speed and reaches a measurement position at a predetermined measurement point $X_i$. For the position of the measurement point $X_i$, the marking is viewed by a CCD sensor or the like (not shown) to confirm a previously set measurement position. In measurement of one rotor disk, the measurement starting point is determined, the gas turbine rotor 1 is rotated one turn while the position of the measurement point $X_i$ is confirmed, and thus measured values at all the measurement points are collected. It may be conceivable that only the measurement starting point is selected on the outer surface of the rotor disk as the measurement point $X_i$, and other measurement points are selected by rotation angles from the measurement starting point determined by the rotation indicator 3.

The calculation part 64 includes a misalignment calculation part 641, an abnormal value determination part 642, and a measured value updating part 643.

The misalignment calculation part 641 reads all the measured values $P_i$ from the storage part 63, sets a radial displacement amount $a_1$ first stored to an initial value, subtracts each radial displacement amount $a_1$ from all the radial displacement amounts $a_i$ (radial displacement amount $a_i$–radial displacement amount $a_1$→radial displacement amount $a_i$), and calculates a new radial displacement amount $a_i$.

Alternatively, the data stored in the storage part 63 may be directly used as the radial displacement amount $a_i$. A value obtained by subtracting the data stored in the storage part 63 from a distance (already known) between the center of rotation $O_2$ of the rotational body and the placement position of the displacement gauge 2 may be used as the radial displacement amount $a_i$ (which is the radial displacement amount $a_i$ from the center of rotation $O_2$). Further, assuming a reference circle, a value obtained by subtracting the data stored in the storage part 63 and a radius of the reference circle from the distance (already known) between the center of rotation $O_2$ of the rotational body and the placement position of the displacement gauge 2 may be used as the radial displacement amount $a_i$.

Three measurement points are selected to determine a calculated circle based on Expression 4. From the determined calculated circle, a calculated circle value $Q_{i,j}$ for each measurement point $X_i$ is calculated. Then, from the measured value $P_i$ and the calculated circle value $Q_{i,j}$ at each measurement point $X_i$, an error amount $\Delta_{i,j}$ is calculated by Expression 1. Further, a total error amount value $\Delta S_j$ is derived from the error amount $\Delta_{i,j}$ by Expression 2. By the same process, other calculated circles are determined from other combinations of three measurement points, and a total error amount value $\Delta S_j$ for each calculated circle is derived. A minimum total error amount value $\Delta S_a$ is determined among the total error amount values $\Delta S_j$, and the calculated circle for the minimum total error amount value $\Delta S_a$ is regarded as a most probable circle. Deviation between the center of the most probable circle and the center of rotation $O_2$ of the rotational body is calculated to determine misalignment data of the most probable circle including an eccentric distance e and a misalignment angle $\theta_a$, and the misalignment data is stored in the storage part 63.

The abnormal value determination part 642 determines whether an error amount for the most probable circle determined by the misalignment calculation part 641, that is, the most probable circle error amount $\Delta_{i,a}$ is within a reference value or not. All the most probable circle error amounts $\Delta_{i,a}$ are desirably within the reference value. When the most probable circle error amount $\Delta_{i,a}$ (for example, i=f) exceeds the reference value, the measured value $P_f$ (or radial displacement amount $a_f$) is recognized as an abnormal value.

The measured value updating part 643 provides an instruction to perform remeasurement to the displacement gauge 2 and the deflection amount detection part 62 when the measured value $P_f$ is recognized as the abnormal value. A remeasured value obtained by remeasurement by the deflection amount detection part 62 is once stored in the storage part 63, and then called up by the measured value updating part 643, and the measured value is replaced with the remeasured value to finish updating the measured value. The calculation procedure of misalignment shown in FIG. 5 is repeated with reference to the measured value after updating.

Figure 10:
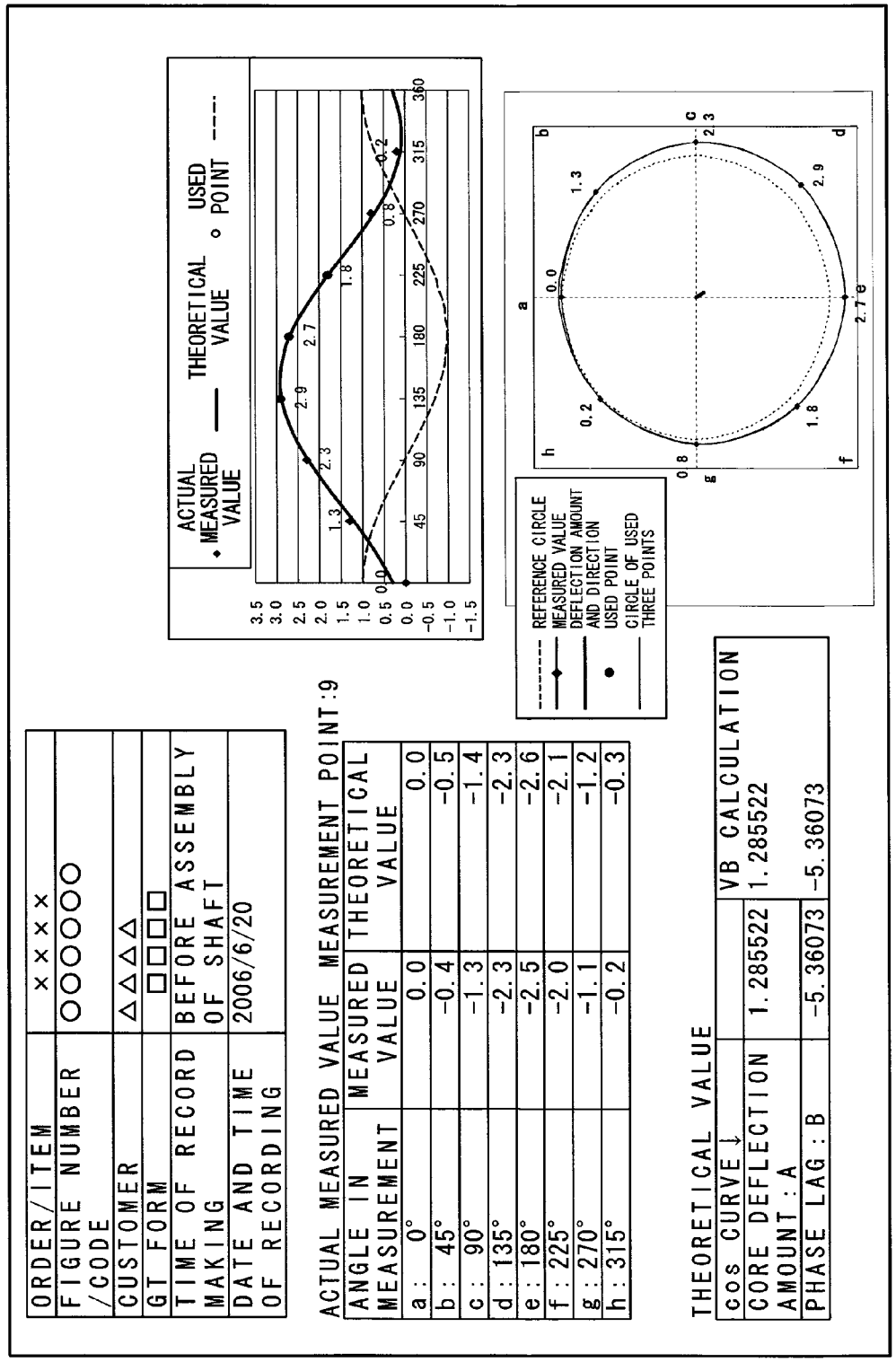
FIG. 10 is a diagram showing an example of an input/output screen of the misalignment calculation system.
Figure 11:
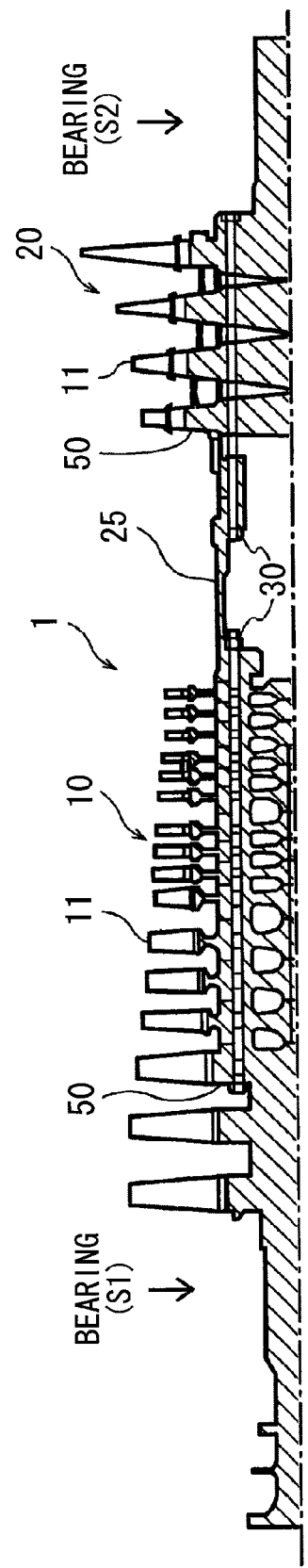
FIG. 11 is a diagram showing a structure of the gas turbine rotor.
Figure 12:
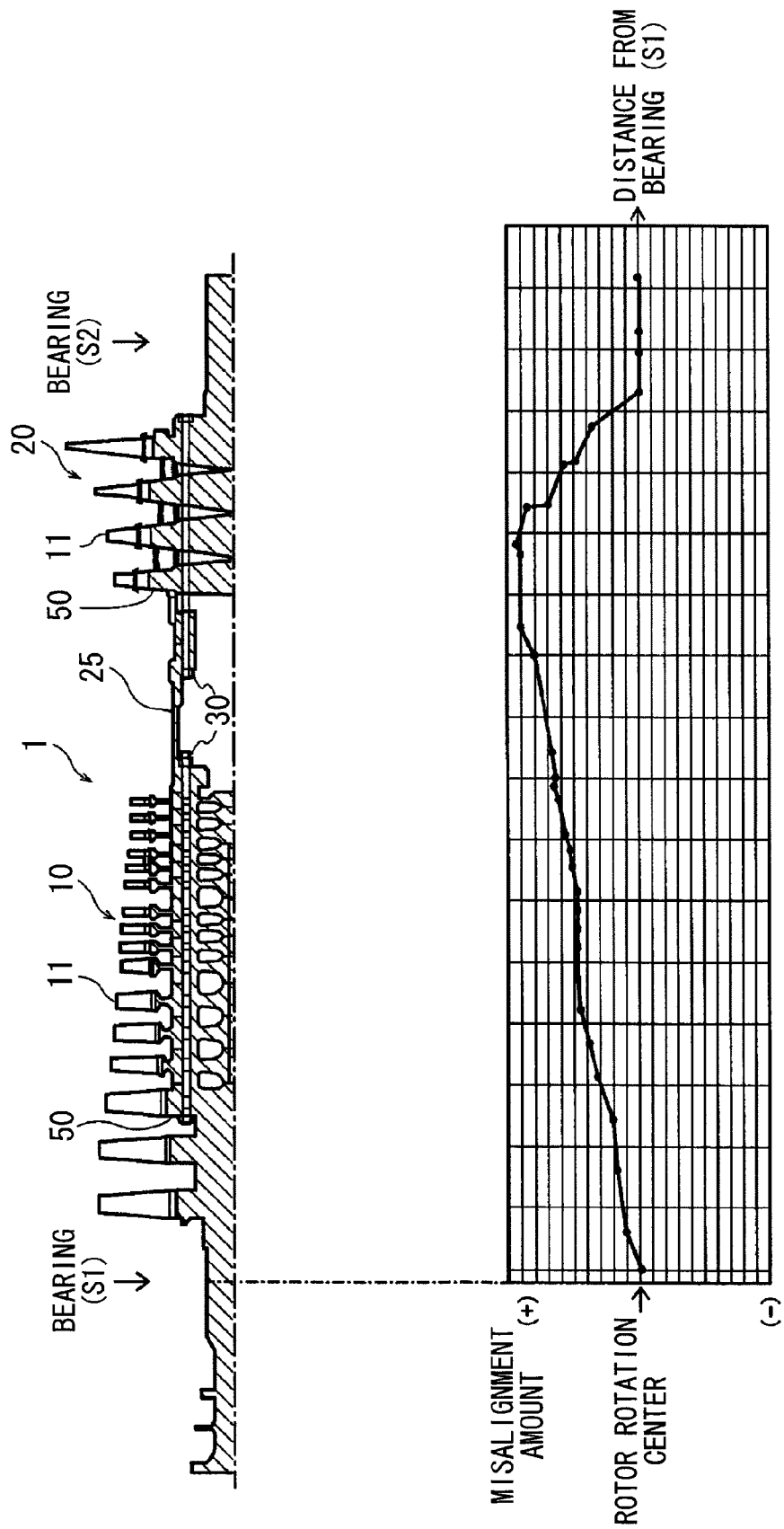
FIG. 12 shows the distribution of axial deformation of the gas turbine rotor.

The display part 65 displays the misalignment data of the most probable circle including a misalignment amount and a misalignment angle called up from the storage part 63. Further, when an abnormal value is included, the target measurement point $X_f$ and a measured value $P_f$ and an error amount $\Delta_f$, $a$ at the measurement point $X_f$ are displayed. FIG. 10 shows an example of an input/output screen of the system.

With the system, the misalignment data of the most probable circle (eccentric distance e and misalignment angle $\theta_a$) can be obtained by a simple method, the abnormal value can be easily specified and replaced with the remeasured value, thereby allowing the misalignment amount and the misalignment angle to be easily calculated.

EXAMPLE 1

A specific example of the method for calculating misalignment at the time of normal measurement will be described taking the rotor disk that constitutes the gas turbine rotor 1 as an example. In this example, the rotor disk is circumferentially divided into eight sections, and a deflection amount at each measurement point is measured to calculate misalignment data.

Figure 8:
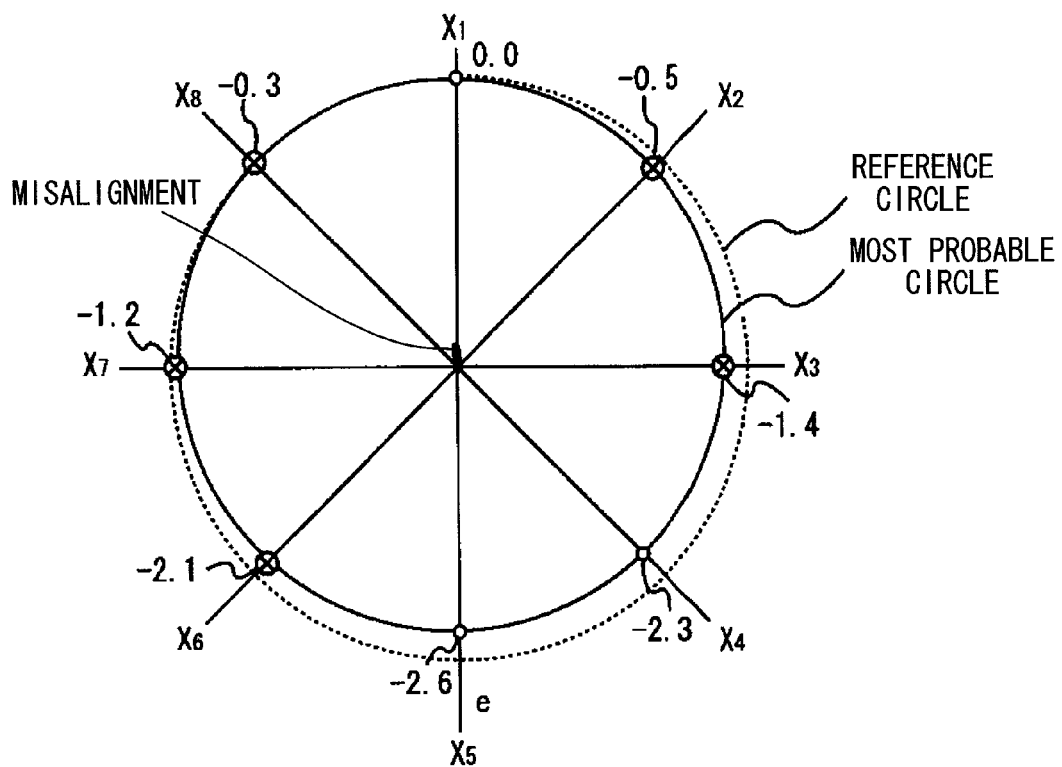
FIG. 8 is a schematic diagram of a relationship between a measured value and a most probable circle in connection with Example 1 according to the best mode for carrying out the present invention.

FIG. 7 shows measured values and most probable circle calculated circle values for measured angles at eight measurement points as Example 1, and shows a misalignment amount and a misalignment angle included in misalignment data of the most probable circle. In this example, three points $X_1$, $X_4$ and $X_5$ are used as measurement points for calculating a calculated circle. The most probable circle calculated circle value refers to a calculated circle value at each measurement point for a most probable circle in this example. FIG. 8 schematically shows the relationship as a relationship among the reference circle, the most probable circle and the measured value, and shows the misalignment amount and the misalignment angle. In this example, most probable circle error amounts at the measurement points were all within the reference value, both the misalignment amount and the misalignment angle were small, and there was no problem in practical use.

EXAMPLE 2

An example of a case where an abnormal value appears in the measured value at the time of measurement of the rotor disk of the gas turbine rotor 1 will be described below. This example shows a case where an abnormal value appears at one measurement point (measurement point $X_5$) among the eight measurement points.

Example 2 in FIG. 7 shows measured values and most probable circle calculated circle values at the measurement points, and shows a misalignment amount and a misalignment angle. In this example, three points $X_1$, $X_2$ and $X_8$ are used as measurement points for calculating a calculated circle. FIG. 9 shows most probable circle error amounts for measured values and most probable circle calculated circle values in this example. In FIG. 7, according to the present invention, even if the abnormal value in Example 2 appears, a final misalignment amount and misalignment angle are substantially the same as in Example 1 at the time of normal measurement, and there is little influence in practical use on calculation accuracy of misalignment even at the time of abnormal measurement. Meanwhile, in FIG. 9, the measurement point $X_5$ indicates an incomparably larger error amount than the other measurement points, which extremely exceeds the reference value. Thus, according to the present invention, the measurement point with the abnormal value can be easily specified with reference to the most probable circle error amount.

Applying the method for calculating misalignment of the present invention allows the most probable circle to be relatively simply, accurately specified to obtain the misalignment data of the most probable circle. Also, the abnormal value can be easily specified, thereby allowing the abnormal value to be easily eliminated and replaced with the remeasured value.

The embodiment of the present invention has been described, but it should be understood that the present invention is not limited to the embodiment, and various changes may be made in a specific structure of the present invention within the scope thereof. For example, the deflection amount detection part 62, the storage part 63, the calculation part 64 (misalignment calculation part 641, abnormal value determination part 642, measured value updating part 643) are not limited to those in the form of individual electronic circuit units (IC unit cards), but may be those in the form of programs (or sequences) or storage memories in a computer.

For the measured value $P_i$ and the measured angle $\theta_i$, it may be conceivable that while the gas turbine rotor 1 is rotated one turn, data from the displacement gauge 2 and the rotation indicator 3 is continuously measured, the continuous data is stored in the storage part 63, then at least four or more arbitrary points are extracted, and the radial displacement amount $a_i$ and the measured angle $\theta_i$ are derived and stored based on the data of the arbitrary points.

The invention claimed is:

1. A method of calculating misalignment of a rotational body, said method comprising the steps of:
    measuring radial displacement values using a displacement gauge;
    deriving, by a calculation part, radial displacement amounts of the rotational body for at least four or more measurement points along an outer surface in a circumferential direction based on the measured values measured by the displacement gauge while rotating the rotational body;
    selecting, by the calculation part, three arbitrary points among all the measurement points to calculate a circle from the radial displacement amounts and measured angles;
    calculating, by the calculation part, circle values for all the measurement points from the calculated circle;
    calculating, by the calculation part, differences between the calculated circle values and the radial displacement amounts as error amounts at the measurement points;
    summing, by the calculation part, the error amounts to derive a total error amount;
    repeating, by the calculation part, circle calculation for different combinations of three measurement points among all the measurement points and calculating, by the calculation part, a total error amount for each calculated circle;
    selecting, by the calculation part, a calculated circle with a minimum total error amount among obtained total error amounts for all combinations as a most probable circle; and
    calculating, by the calculation part, deviation between the center of the most probable circle and the center of rotation of the rotational body as misalignment data of the most probable circle.

2. The method according to claim 1, wherein the misalignment data of the most probable circle includes a misalignment amount and a misalignment angle.

3. The method according to claim 1, wherein a measured value at a measurement point corresponding to a most probable circle error amount that is a difference between the calculated circle value and the radial displacement amount on the most probable circle is recognized as an abnormal value when the most probable circle error amount exceeds a reference value.

4. The method according to claim 3, wherein the measured value recognized as the abnormal value is remeasured to obtain a remeasured value and the measured value is replaced with the remeasured value when the most probable circle error amount exceeds the reference value.

5. The method according to claim 1, wherein the rotational body is a gas turbine rotor.

6. A system for calculating misalignment of a rotational body, comprising:
    an input part that sets at least four or more measurement points in one turn of the rotational body;
    a deflection amount detection part that derives radial displacement amounts of the rotational body for the at least four or more measurement points along an outer surface in a circumferential direction of the rotational body based on measured values measured by a displacement gauge;
    a storage part that stores the radial displacement amounts derived by the deflection amount detection part and measured angles at the measurement points; and
    a calculation part that calculates misalignment data of a most probable circle of the rotational body based on data stored in the storage part,
    wherein the calculation part
        selects three arbitrary points among all the measurement points stored in the storage part to calculate a circle from the radial displacement amounts and the measured angles,
        calculates circle values for all the measurement points from the calculated circle,
        calculates differences between the calculated circle values and the radial displacement amounts as error amounts at the measurement points,
        sums the error amounts to derive a total error amount,
        repeats circle calculation for different combinations of three measurement points among all the measurement points and calculates a total error amount for each calculated circle,
        selects a calculated circle with a minimum total error amount among obtained total error amounts for all combinations as the most probable circle, and
        calculates deviation between the center of the most probable circle and the center of rotation of the rotational body as misalignment data of the most probable circle.

7. The system for calculating misalignment of a rotational body according to claim 6, wherein the calculation part includes an abnormal value determination part that recognizes, as an abnormal value, a measured value at a measurement point corresponding to a most probable circle error amount that is a difference between the calculated circle value and the radial displacement amount on the most probable circle when the most probable circle error amount exceeds a reference value.

8. The system for calculating misalignment of a rotational body according to claim 7, wherein the calculation part includes a measured value updating part that calls up a remeasured value obtained by the deflection amount detection part from the storage part and replaces the measured value with the remeasured value when the most probable circle error amount exceeds the reference value.

* * * * *